(12) United States Patent
Akishev et al.

(10) Patent No.: US 7,458,802 B2
(45) Date of Patent: Dec. 2, 2008

(54) FOLDABLE MANDREL FOR PRODUCTION OF A SINGLE CURVATURE FOLDED CORE FOR A SANDWICH PANEL

(75) Inventors: Niaz Irekovich Akishev, Kazan (RU); Ildus Muhametgaleevich Zakirov, Kazan (RU); Alexandr Vladimirovich Nikitin, Kazan (RU)

(73) Assignees: Airbus, Blagnac (FR); Otkrytoe Aktsionernoe Obschestvo "Kazansky Nauchno-Isledovatelsky Institut Aviatsionnoi Tekhnologii", Kazan (RU)

( * ) Notice: Subject to any disclaimer, the term of this patent is extended or adjusted under 35 U.S.C. 154(b) by 359 days.

(21) Appl. No.: 10/581,687

(22) PCT Filed: Dec. 17, 2003

(86) PCT No.: PCT/RU03/00554

§ 371 (c)(1),
(2), (4) Date: Jun. 6, 2006

(87) PCT Pub. No.: WO2005/058521

PCT Pub. Date: Jun. 30, 2005

(65) Prior Publication Data

US 2007/0184144 A1    Aug. 9, 2007

(51) Int. Cl.
*B29C 53/02* (2006.01)
*B29C 53/22* (2006.01)

(52) U.S. Cl. ............... 425/520; 425/369; 425/396; 425/403; 72/385; 493/463

(58) Field of Classification Search ............... 425/506, 425/520, 335–336, 369, 394–396, 403; 72/38, 72/54, 60, 61, 370.22, 379.6, 385; 493/395, 493/463
See application file for complete search history.

(56) References Cited

U.S. PATENT DOCUMENTS 3,698,879 A    10/1972   Lucien et al.
4,616,991 A  * 10/1986   Bach et al. .................. 425/396

(Continued)

FOREIGN PATENT DOCUMENTS

EP    0 068 633    1/1983

*Primary Examiner*—Yogendra Gupta
*Assistant Examiner*—Thu Khanh T Nguyen
(74) *Attorney, Agent, or Firm*—Oblon, Spivak, McClelland, Maier & Neustadt, P.C.

(57) ABSTRACT

The invention can be defined in its most general form as a device for sheet material corrugation by means of bending and can be applied in the devices for production of single curvature folded core used in production of aircraft and craft curvilinear panels. The invention has for its object to broaden the technological capabilities. For that the mandrel is made in the form of a set of alternating rows of plane elements (4, 6, 7) made in the form of trapeziums (4) and isosceles triangles (6, 7) fixed on the flexible material of the base (5) forming thus the gap-pivots between the elements. At the same time the bases of the triangular elements (6, 7) face each other in pairs along the bending lines while said bending lines correspond to the protrusions lines of the core folded structure. The base of the triangular elements (6, 7) is the function of the folded core block curvature radius and the geometrical parameters of the zigzag crimp structure. The width of the gap-pivots is taken so that to provide the folding of the mandrel together with the blank forming thus the single curvature zigzag corrugated structure with the lateral direction of crimps.

3 Claims, 2 Drawing Sheets

U.S. PATENT DOCUMENTS

| | | | |
|---|---|---|---|
| 4,923,544 A * | 5/1990 | Weisse | 264/261 |
| 5,000,673 A * | 3/1991 | Bach et al. | 425/396 |
| 5,008,140 A | 4/1991 | Schmertz | |
| 5,200,013 A * | 4/1993 | Traber | 425/396 |
| 6,274,216 B1 * | 8/2001 | Gonidec et al. | 156/197 |
| 6,579,404 B2 * | 6/2003 | Lewis et al. | 264/338 |
| 6,773,791 B1 * | 8/2004 | Ruggie et al. | 428/156 |

\* cited by examiner

FOLDABLE MANDREL FOR PRODUCTION OF A SINGLE CURVATURE FOLDED CORE FOR A SANDWICH PANEL

TECHNICAL FIELD

The invention can be defined in its most general form as a device for sheet material corrugation by means of bending.

BACKGROUND ART

Known is a device for production of intricate profile articles from composite material including the shaping mandrel made from plane semirevolving elements connected in-between with the use of hermetic fabric forming the pivots along the perimeter of said elements (Inventors' certificate no. 1,706,148 SU, Int. Cl.: B 29 C 59/00, B 29 D 9/00//B 29 K 105:08, B 29 L 9:00. Device for production of intricate profile articles from composite material. Bulletin no. 33 of 27.11.96).

The main short-coming of herein-presented device is the impossibility to produce the curvilinear corrugated article.

Taken as a prototype is a transformable die for production of folded structure with cylinder envelope (V. I. Khaliulin, Technological schemes for sandwich structures production, KSTU, Kazan, 1999.—168 p., p. 128.—ISBN 5-7579-0295-7).

The transformable die is a 3-D relief structure multilink mechanism consisting of the plane elements, made in the form of the parallelograms, pivotedly connected in-between along the perimeter with the use of the fabric whereon said elements are fixed with the use of glue. The outline of the transformable die in its initial state coincides in dimensions and relief shape with those of the produced z-crimp but differing from it only in curvature. To transform the die used is the power drive, e.g. compressive.

The main short-coming of herein-presented device is that it provides production of folded structure only with longitudinal direction of zigzag crimps, i.e. in the direction of cylinder generatrix. At the same time, in production, e.g. of aircraft fuselage panels, required is the core having the lateral direction of crimps providing the removal of condensate from the inner cavities of the panels.

DISCLOSURE OF INVENTION

The invention has for its object to broaden the technological capabilities owing to production of single curvature sandwich panel folded core with lateral direction of zigzag crimps from sheet material.

The technical result attained at executing of the claimed invention is the improvement of aircraft sandwich panels operating characteristics owing to the possibility to remove the condensate out of the folded core inner cavities.

In accordance with the stated technical solution the stated technical result is attained by that the known transformable mandrel used for production of single curvature sandwich panels folded core and being the shaping surface from plane trapezoid elements pivotedly connected in-between with the use of the flexible material whereon said elements are fixed with the use of glue:

1) includes the rows of plane elements, made in the form of isosceles triangles and placed in line between the trapezoid elements, wherein said plane elements are pivotedly connected with said trapezoid elements along the folded structure saw-tooth lines and are oriented so that their bases facing each other form the pivots along the protrusions zigzag lines, and their vertices form the pivots along the recesses zigzag lines;

2) the base dimension B of the triangular elements along the folded structure protrusions zigzag lines is equal to the function:

$$B = f(R, S, L, H),$$

where R is the folded core block curvature radius,
S is the step between the recesses zigzag lines of the folded core,
L is the step between the saw-tooth lines,
H is the height of the folded core block.

3) the minimal widths $S_1$ and $S_2$ of the pivots along the lines corresponding to the ready-made folded core lines of protrusions and recesses are equal to:

$$S_1 = 2t + 2m + 2z;$$

$$S_2 = 2t + 2m,$$

where t is the shaping surface plane elements material thickness,
m is the thickness of the base and the glue,
z is the blank material thickness.

The undertaken by the applicant state of the art analysis shows that there are no analogs characterized by the combination of the features identical to those of the invention. Therefore, the claimed technical solution satisfies the "novelty" condition of patentability.

The results of retrieval for the known solutions in the given area with the aim to reveal the features identical with distinctions of the claimed technical solution show that its features do not result from the state of the art. From the defined state of the art the applicant managed to reveal no influence of the specified essential features upon the attainment of the stated technical result. The claimed technology, therefore, satisfies the "inventive step" condition of patentability.

BRIEF DESCRIPTION OF DRAWINGS

The FIGS. 1-2 present the essence of the invention.

BEST MODE FOR CARRYING OUT THE INVENTION

Figure 1:
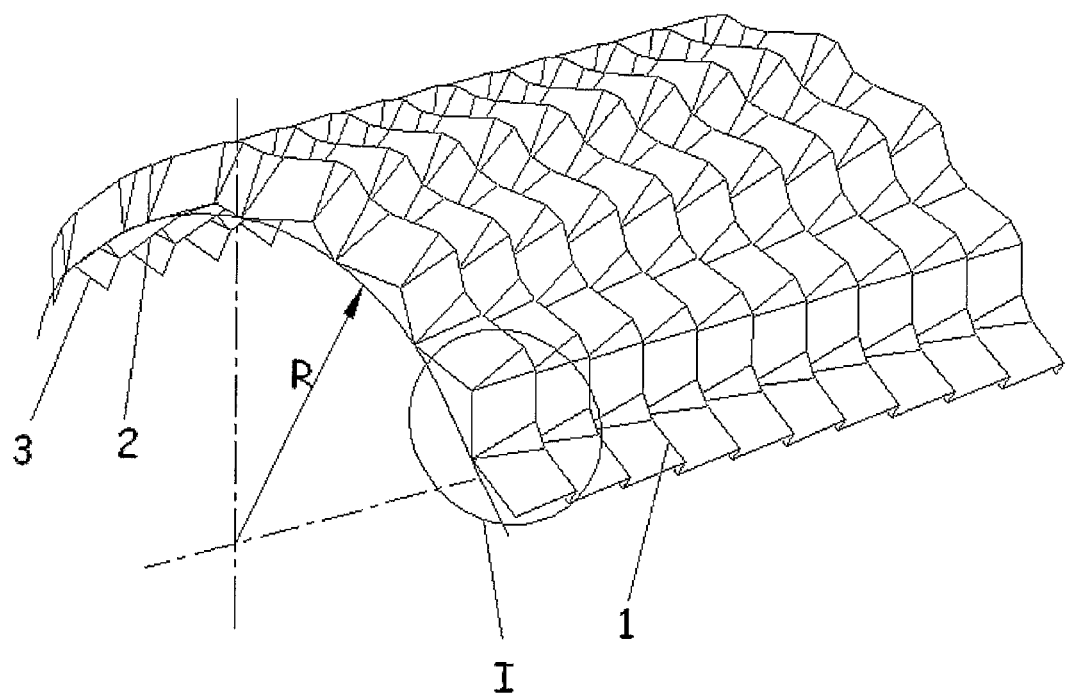
FIG. 1 presents the transformable mandrel in its final position.
Figure 1:
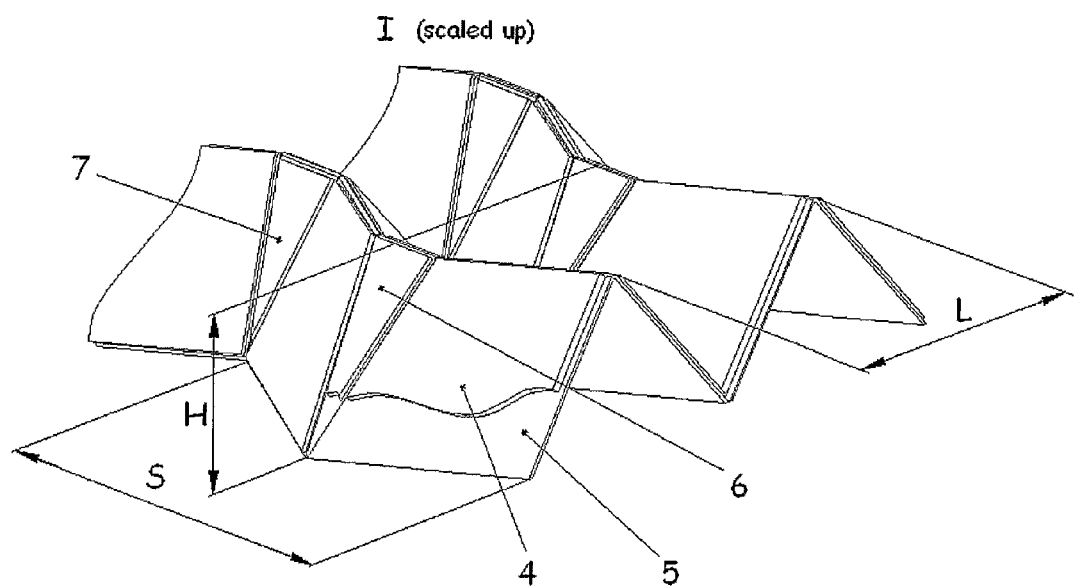
Figure 2:
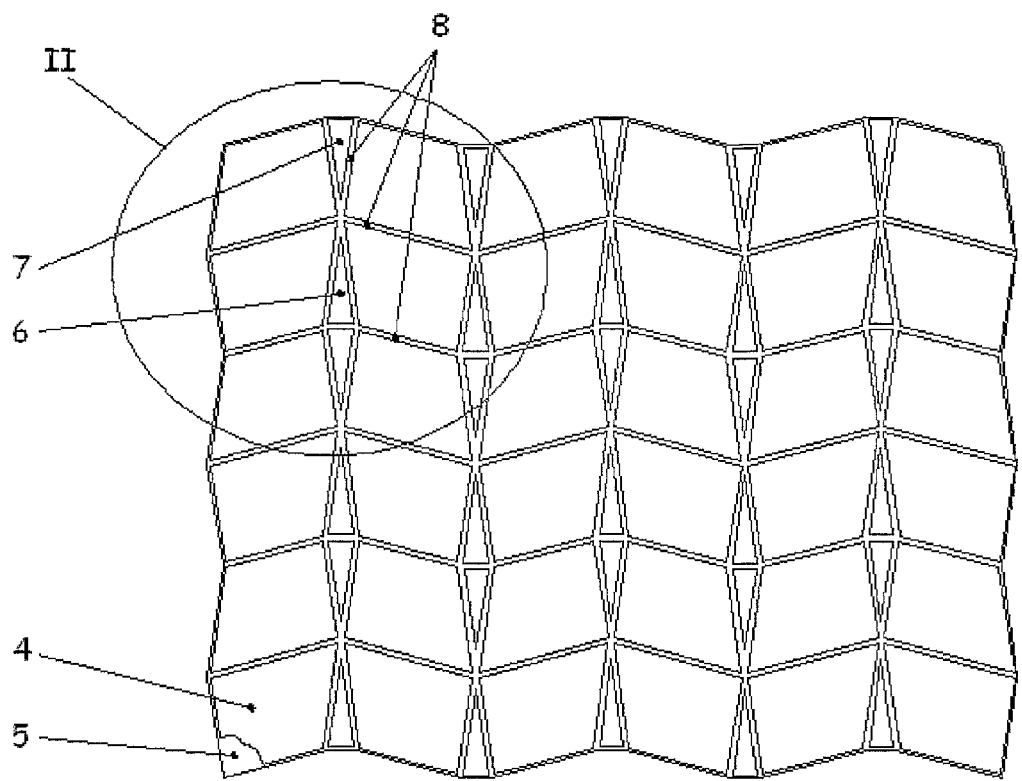
FIG. 2 is a general view of the transformable mandrel (development).
The FIGS. 1-2 present the following positions:
1 is the folded core protrusions zigzag line; 2 is the recesses zigzag line; 3 is the folded core saw-tooth line; 4 is the plane trapezoid element of the shaping surface; 5 is the material of the base; 6 and 7 are the plane triangular wedge-shaped elements of the shaping surface; 8 are the pivots.
Figure 2:
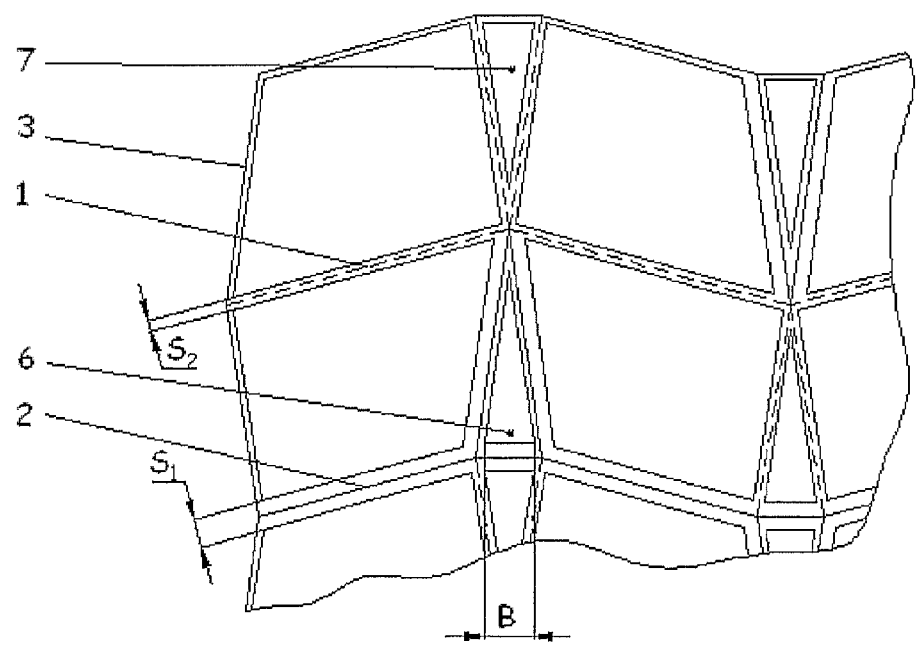

The transformable mandrel is the system of plane rigid elements 4, 6 and 7, e.g. from sheet metal, glued onto the base 5 from flexible material wherewith the gaps are formed. The base 5 in the gaps between the plane elements 4, 6 and 7 serves as the pivots 8. The elements 4 have the form of improper trapezium and correspond to the folded core ridges which form the zigzag crimps. At the same time the parallel edges of neighboring elements form the gap-pivot oriented along the protrusions and recesses zigzag lines rectilinear parts. Located between them elements 6 and 7, oriented in the direction of the core lines 3 and whose wedge bases face each other, form the gap-pivot along the lines 1. In that way the wedge sharp vertices face each other and reach the pivot line along the line 2. The plane elements 4, 6 and 7 form the transformable shaping surface which in its developed state coincide in outline and pivots lines with the produced article development with the marked-out bending lines.

The base B of triangular elements 6 and 7 is equal to the function $$B = f(R, S, L, H),$$

where R is the folded core block curvature radius, S is the step between the recesses zigzag lines of the folded core, L is the step between the saw-tooth lines, H is the height of the folded core block.

The width of the pivots is taken so that to provide the transformation (folding) of the whole system of elements together with the blank forming thus the 3-D relief structure. The width $S_1$ of the pivot along the line 1 is equal to $$S_1 = 2t + 2m + 2z,$$

and the width $S_2$ of the pivot along the line 2 is equal to $$S_2 = 2t + 2m;$$

where t is the shaping surface plane elements material thickness, m is the thickness of the base and the glue, z is the blank material thickness.

The blank from sheet material, cut out in the form similar in shape and dimensions to that of the transformable mandrel in its developed state, is put onto the shaping surface matching the outlines whereupon they are simultaneously transformed (folded) forming thus from the plane structure the 3-D structure with the given relief geometries R, S, L, H. This transformation can be executed with the use, e.g. of vacuum-treatable bag.

INDUSTRIAL APPLICABILITY

The claimed invention can be applied in the devices for production of single curvature folded core used in production of aircraft and craft curvilinear panels.

The invention claimed is:

1. A transformable mandrel for production of single curvature sandwich panels folded core being the shaping surface from plane trapezoid elements pivotedly connected in-between with the use of the flexible material whereon said elements are fixed with the use of glue is characterized by that the shaping surfaces includes the plane elements, made in the form of isosceles triangles and placed in line between the trapezoid elements, wherein said plane elements are pivotedly connected with said trapezoid elements along the folded structure saw-tooth lines and are oriented so that their bases facing each other form the pivots along the protrusions zigzag lines, and their vertices form the pivots along the recesses zigzag lines.

2. A transformable mandrel according to claim 1 is characterized by that the base B of the triangular elements along the protrusions zigzag lines of the folded structure is equal to the function $$B = f(R, S, L, H),$$

where R is the folded core block curvature radius,
S is the step between the recesses zigzag lines of the folded core,
L is the step between the saw-tooth lines,
H is the height of the folded core block.

3. A transformable mandrel according to claim 1 is characterized by that the minimal widths $S_1$ and $S_2$ of the pivots along the lines, which correspond to the lines of protrusions and recesses of the ready-made folded core, are equal to $$S_1 = 2t + 2m + 2z;$$

$$S_2 = 2t + 2m,$$

where t is the shaping surface plane elements material thickness,
m is the thickness of the base and the glue,
z is the blank material thickness.

* * * * *